(12) United States Patent
Li et al.

(10) Patent No.: US 10,299,194 B2
(45) Date of Patent: May 21, 2019

(54) METHOD FOR FACILITATING NETWORK IDENTIFICATION, ACCESS NODE, METHOD FOR NETWORK IDENTIFICATION AND USER EQUIPMENT

(71) Applicant: Telefonaktiebolaget LM Ericsson (publ), Stockholm (SE)

(72) Inventors: Gen Li, Beijing (CN); Tim Irnich, Neuss (DE)

(73) Assignee: TELEFONAKTIEBOLAGET LM ERICSSON, Stockholm (SE)

(*) Notice: Subject to any disclaimer, the term of this patent is extended or adjusted under 35 U.S.C. 154(b) by 50 days.

(21) Appl. No.: 15/527,802

(22) PCT Filed: Dec. 8, 2014

(86) PCT No.: PCT/CN2014/093228
§ 371 (c)(1),
(2) Date: May 18, 2017

(87) PCT Pub. No.: WO2016/090526
PCT Pub. Date: Jun. 16, 2016

(65) Prior Publication Data
US 2018/0352502 A1 Dec. 6, 2018

(51) Int. Cl.
*H04W 24/02* (2009.01)
*H04W 48/16* (2009.01)
(Continued)

(52) U.S. Cl.
CPC ........... *H04W 48/16* (2013.01); *H04W 48/10* (2013.01); *H04W 56/0015* (2013.01); *H04W 88/08* (2013.01)

(58) Field of Classification Search
CPC .............................................. H04W 72/0426
See application file for complete search history.

(56) References Cited

U.S. PATENT DOCUMENTS

2005/0147060 A1 7/2005 Buckley
2010/0020710 A1* 1/2010 Gupta .................. H04J 11/0093
370/252
(Continued)

FOREIGN PATENT DOCUMENTS

CN 101651881 A 2/2010
JP 2011525089 A 9/2011
(Continued)

OTHER PUBLICATIONS

Extended European Search Report for Application No. EP14907856.0, dated May 24, 2018, 14 pages.
(Continued)

*Primary Examiner* — Zhiren Qin
(74) *Attorney, Agent, or Firm* — Nicholson De Vos Webster & Elliott LLP

(57) ABSTRACT

A method (200) for facilitating network identification is provided. The method comprises, at an access node of a first network: detecting (S210) a physical-layer-related identity of each of one or more neighboring access nodes; decoding (S220), for each of the one or more neighboring access nodes, a network identity of the neighboring access node; for each of the one or more neighboring access nodes: determining (S230) whether the neighboring access node belongs to the first network or a different network; and determining (S230) an identity group in which the detected physical-layer-related identity of the neighboring access node is included; and selecting (S240), as a physical-layer-related identity of the access node, a physical-layer-related identity from an identity group other than any identity group in which a physical-layer-related identity of a neighboring access node belonging to a different network is included.

8 Claims, 5 Drawing Sheets

(51) Int. Cl.
*H04W 48/10* (2009.01)
*H04W 56/00* (2009.01)
*H04W 88/08* (2009.01)

(56) References Cited

U.S. PATENT DOCUMENTS

| | | | |
|---|---|---|---|
| 2010/0069119 A1 | 3/2010 | Mueck | |
| 2010/0074235 A1 | 3/2010 | Sebire et al. | |
| 2012/0281573 A1* | 11/2012 | Kazmi | H04W 8/26 370/252 |
| 2013/0039194 A1* | 2/2013 | Siomina | H04W 52/244 370/252 |
| 2013/0265901 A1 | 10/2013 | Pedersen et al. | |
| 2014/0092777 A1* | 4/2014 | Liu | H04W 48/16 370/254 |
| 2014/0112200 A1 | 4/2014 | Lor et al. | |
| 2015/0181443 A1* | 6/2015 | Hu | H04W 24/02 455/434 |

FOREIGN PATENT DOCUMENTS

| | | |
|---|---|---|
| JP | 2011529303 A | 12/2011 |
| JP | 2013526220 A | 6/2013 |
| RU | 2488238 C2 | 7/2013 |
| WO | 2011023234 A1 | 3/2011 |
| WO | 2011141883 A1 | 11/2011 |
| WO | 2013113361 A1 | 8/2013 |

OTHER PUBLICATIONS

Nokia Siemens Networks, et al., "Solution(s) to the 36.902's 'Automated Configuration of Physical Cell Identity' Use Case," 3GPP TSG-RAN WG3 Meeting #59-bis, R3-080812, Mar. 31-Apr. 3, 2008, 7 pages.
Vodafone, "Country Border Issue in EUTRAN," 3GPP TSG RAN WG2 #62, R2-082321, May 5-9, 2008, pp. 1-7.
International Search Report and the Written Opinion for Application No. PCT/CN2014/093228, dated Sep. 9, 2015, 11 pages.
Office Action and Search Report from foreign counterpart Russian Patent Application No. 2017123941, dated Jul. 9, 2018, 17 pages.
International Preliminary Report on Patentability for Application No. PCT/CN2014/093228, dated Jun. 13, 2017, 4 pages.
Decision to Grant a Patent from foreign counterpart Japanese Patent Application No. 2017-524439, dated Nov. 19, 2018, 6 pages.
Notification of Reasons for Refusal from foreign counterpart Japanese Patent Application No. 2017-524439, dated Jun. 19, 2018, 15 pages.

* cited by examiner

METHOD FOR FACILITATING NETWORK IDENTIFICATION, ACCESS NODE, METHOD FOR NETWORK IDENTIFICATION AND USER EQUIPMENT

CROSS-REFERENCE TO RELATED APPLICATIONS

This application is a National stage of International Application No. PCT/CN2014/093228, filed Dec. 8, 2014, which is hereby incorporated by reference.

TECHNICAL FIELD

The present disclosure relates to wireless communications, and more particularly, to a method for facilitating network identification, an access node, a method for network identification and a User Equipment (UE).

BACKGROUND

In order to provide large bandwidth and high-capacity coverage, Access Nodes (ANs) in a network typically share the entire spectrum available in the network. For example, in a millimeter wave (mmW) network, a number of "high-capacity coverage islands" are deployed and the entire spectrum available in the mmW network is reused by each of these islands.

FIG. 1 shows an exemplary scenario of spectrum reuse. Two networks, a network 110 and a network 120, are shown in FIG. 1. The coverage area of the network 110 and the coverage area of the network 120 partially overlap each other, as shown by the dashed lines in FIG. 1. The networks 110 and 120 may belong to different network operators and may be allocated with the same spectrum. The network 110 includes two ANs, AN 111 and AN 112, and the network 120 includes two ANs, AN 121 and AN 122. All the ANs 111, 112, 121 and 122 in FIG. 1 share the same spectrum. FIG. 1 also shows three User Equipments (UEs) 101, 102 and 103. Here, the UE 101 is served by the AN 111, the UE 102 is served by the AN 112 and the UE 103 is served by the AN 122. It can also be seen from FIG. 1 that the UE 102 is located in the overlapped area and it is assumed here that the UE 102 is within the coverage of each of the ANs 111, 112 and 121. In the following, operations performed by the UE 102 will be described as an example, without loss of generality.

The UE 102 may need to obtain information related to a neighboring AN (if any), e.g., to discover a neighboring AN or to perform measurements related to a neighboring AN. Such neighbor discovery or measurement can be periodical or event-triggered. For example, the UE 102 may need to measure a Reference Signal Received Power (RSRP) from an intra-network AN (i.e., an AN of its serving network 110), if any. In doing so, it first needs to listen to a beacon channel to detect if there is any beacon broadcast by a neighboring AN.

A beacon broadcast by a particular AN contains a sync signal sequence (such as Primary Synchronization Signal (PSS) or Secondary Synchronization Signal (SSS) in Long Term Evolution (LTE) system), a reference signal (RS) sequence and system information. The system information includes a Network Identity (NI) which globally uniquely identifies the network the AN belongs to. In this context, a "network" can be a Public Land Mobile Network (PLMN) (in this case the NI can be a PLMN ID) and different "networks" are typically managed by different network operators. The system information further includes an AN Identity (AI) which uniquely identifies the AN locally within the network it belongs to. An example of the AI is the evolved NodeB (eNB) ID in LTE. The system information further includes a Physical AN Identity (PANI) associated with physical layer functions of the AN. A PANI is uniquely associated with a combination of sync signal sequence and reference signal sequence (and their time and frequency locations) and such association is common among different networks. An example of the PANI is the Physical Cell ID (PCI) in LTE.

If there is a beacon broadcast by the AN 121 on the beacon channel, the UE 102 first detects the sync signal sequence blindly. When the UE 102 successfully detects the sync signal sequence, it knows the PANI from the detected sync signal sequence and thus determines the reference signal sequence in the beacon based on the PANI. At that time, the UE 102 measures the received power of the reference signal sequence as the RSRP. Then, the UE 102 derives a channel estimation based on the determined reference signal sequence, and finally decodes the system information in the beacon based on the channel estimation. From the NI included in the system information, the UE 102 knows that the beacon is broadcast by the AN 121 which is an inter-network AN (i.e., an AN of a network different from its serving network 110) instead of an intra-network AN. Thus, the measured RSRP from the AN 121 will be discarded, without being reported to the AN 112.

Similarly, if there is a beacon broadcast by the AN 111 on the beacon channel, the UE 102 also needs to detect the sync signal sequence blindly, determine the reference signal sequence, measure the RSRP and decode the system information. From the NI included in the system information, the UE 102 knows that the beacon is broadcast by the AN 111 which is an intra-network AN. Then, the measured RSRP from the AN 111 will be reported to the AN 112.

That is, the UE cannot identify whether a beacon it detects originates from an intra-network AN or an inter-network AN until it successfully decodes the system information. In the intra-network measurement as discussed above, the RSRP from the inter-network AN is also measured, which is unnecessary and inefficient. This causes a certain amount of delay in the measurement-report process, which may be intolerable in some circumstances. For example, in order to support UE mobility in LTE, the UE is required in an event-triggered measurement to send a measurement report within a short period (e.g., 200 ms for intra-frequency non-DRX (Discontinuous Reception) scenario). The UE may fail to meet this requirement due to the delay.

Even worse, there is a case where the UE 102 may fail to decode the system information. There are typically a limited number of PANIs available (i.e., 504 PCIs in LTE) and thus different ANs in the same or different network(s) may have the same PANI. With cell planning, neighboring ANs of the same network can be allocated with different PANIs by the network operator. However, neighboring ANs from different networks (e.g., AN 111 and AN 121) may have the same PANI due to lack of inter-operator coordination. In this case, when the UE 102 receives two beacons simultaneously, one from the AN 111 and the other from the AN 121 (it is assumed here that the AN 111 and the AN 121 are synchronized and thus the beacons are aligned with each other), the beacons from the AN 111 and the AN 121 contain the same sync signal sequence and the same reference signal sequence. The UE 102 cannot realize that it is receiving beacons from different ANs. Hence, it will successfully detect the sync signal sequence and accordingly measure a combined RSRP (which is meaningless) and derive a combined channel estimation of a channel between the UE 102 and the AN 111 and a channel between the UE 102 and the AN 121. With such combined channel estimation, the UE 102 cannot decode the system information in either of the beacons. In this case, it is impossible for the UE 102 to perform intra-network or inter-network measurement.

There is thus a need for an improved solution for identifying an intra-network AN or an inter-network AN.

SUMMARY

It is an object of the present disclosure to provide a method for facilitating network identification, an access node, a method for network identification and a User Equipment (UE), capable of identifying an intra-network access node or an inter-network access node in a quicker and more efficient manner.

In a first aspect, a method for facilitating network identification is provided. The method comprises, at an access node of a first network: detecting a physical-layer-related identity of each of one or more neighboring access nodes; and decoding, for each of the one or more neighboring access nodes, a network identity of the neighboring access node based on the detected physical-layer-related identity of the neighboring access node. The method further comprises, for each of the one or more neighboring access nodes: determining whether the neighboring access node belongs to the first network or a different network based on the decoded network identity of the neighboring access node; and determining an identity group in which the detected physical-layer-related identity of the neighboring access node is included. The method further comprises: selecting, as a physical-layer-related identity of the access node, a physical-layer-related identity from an identity group other than any identity group in which a physical-layer-related identity of a neighboring access node belonging to a different network is included.

In an embodiment, the physical-layer-related identity of the access node is selected from an identity group in which a physical-layer-related identity of a neighboring access node belonging to the first network is included.

In an embodiment, the method further comprises: transmitting, to a User Equipment (UE), information indicating one or more identity groups associated with the first network. Each identity group includes the physical-layer-related identity of the access node and/or a physical-layer-related identity of at least one neighboring access node of the first network.

In an embodiment, for each access node, its physical-layer-related identity is at least associated with a sync signal sequence used by that access node.

In a second aspect, an access node of a first network is provided. The access node comprises: a detecting unit configured to detect a physical-layer-related identity of each of one or more neighboring access nodes; a decoding unit configured to decode, for each of the one or more neighboring access nodes, a network identity of the neighboring access node based on the detected physical-layer-related identity of the neighboring access node; a determining unit configured to, for each of the one or more neighboring access nodes: determine whether the neighboring access node belongs to the first network or a different network based on the decoded network identity of the neighboring access node; and determine an identity group in which the detected physical-layer-related identity of the neighboring access node is included; and a selecting unit configured to select, as a physical-layer-related identity of the access node, a physical-layer-related identity from an identity group other than any identity group in which a physical-layer-related identity of a neighboring access node belonging to a different network is included.

The above embodiments of the first aspect are also applicable for the second aspect.

In a third aspect, a method for network identification is provided. The method comprises, at a User Equipment (UE) served by a first access node of a first network: detecting a physical-layer-related identity of a second access node; determining an identity group in which the detected physical-layer-related identity is included; and identifying whether the second access node belongs to the first network based on the determined identity group. The first access node and its neighboring access nodes of the first network are associated with one or more identity groups that are different from any identity group associated with any neighboring access node of any other network.

In an embodiment, the step of identifying is performed by: determining whether the determined identity group is identical to any of the one or more identity groups.

In an embodiment, the first access node and its neighboring access nodes of the first network are associated with two or more identity groups. The method further comprises: receiving, from the first access node, information indicating the two or more identity groups.

In an embodiment, for each access node, its physical-layer-related identity is at least associated with a sync signal sequence used by that access node.

In an embodiment, the step of identifying facilitates measurement by the UE regarding the second access node.

In a fourth aspect, a User Equipment (UE) is provided. The UE is served by a first access node of a first network and comprises: a detecting unit configured to detect a physical-layer-related identity of a second access node; a determining unit configured to determine an identity group in which the detected physical-layer-related identity is included; and an identifying unit configured to identify whether the second access node belongs to the first network based on the determined identity group. The first access node and its neighboring access nodes of the first network are associated with one or more identity groups that are different from any identity group associated with any neighboring access node of any other network.

The above embodiments of the third aspect are also applicable for the fourth aspect.

With the embodiments of the present disclosure, available physical-layer-related identities are divided into a number of identity groups and such division is known to access nodes and UEs. An access node selects, as its physical-layer-related identity, a physical-layer-related identity from an identity group other than any identity group in which a physical-layer-related identity of a neighboring access node belonging to a different network is included. Hence, the access node and its neighboring access nodes of the first network, if any, are associated with one or more identity groups that are different from any identity group associated with any neighboring access node of any other network. Accordingly, a UE can determine whether an access node it detects belongs to its serving network or not based on the identity group in which the physical-layer-related identity of that access node is included. In this way, it is possible to identify an intra-network access node or an inter-network access node in a quicker and more efficient manner, without having to decode its network identity.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be noted that the following embodiments are illustrative only, rather than limiting the scope of the disclosure.

Figure 1:
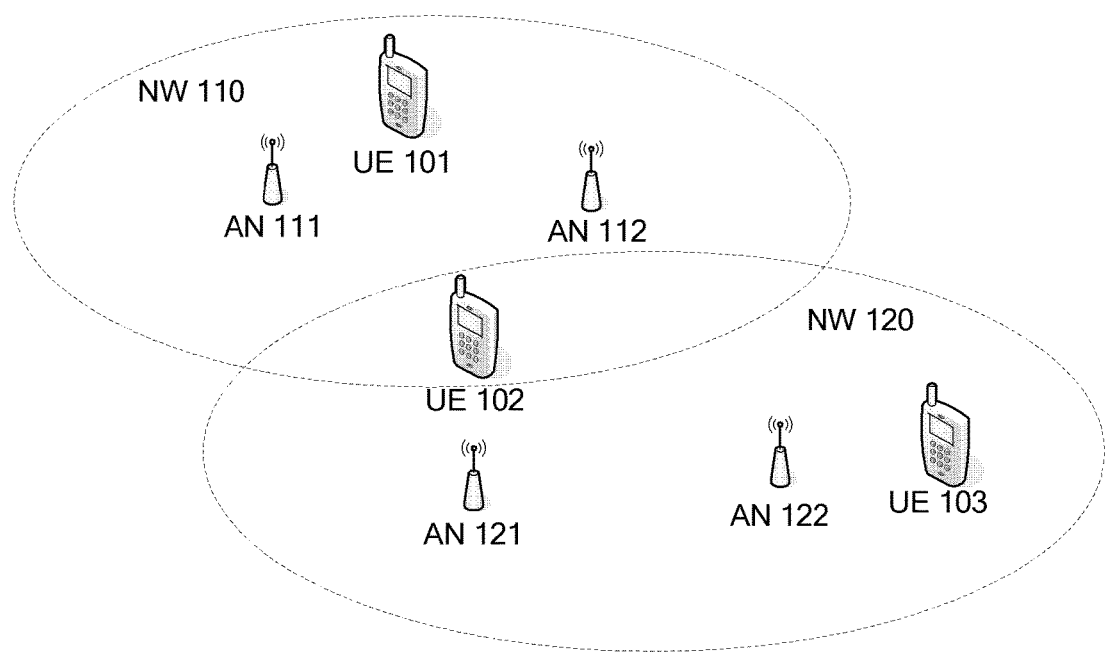
FIG. 1 is a schematic diagram showing an exemplary scenario of spectrum reuse.
Figure 2:
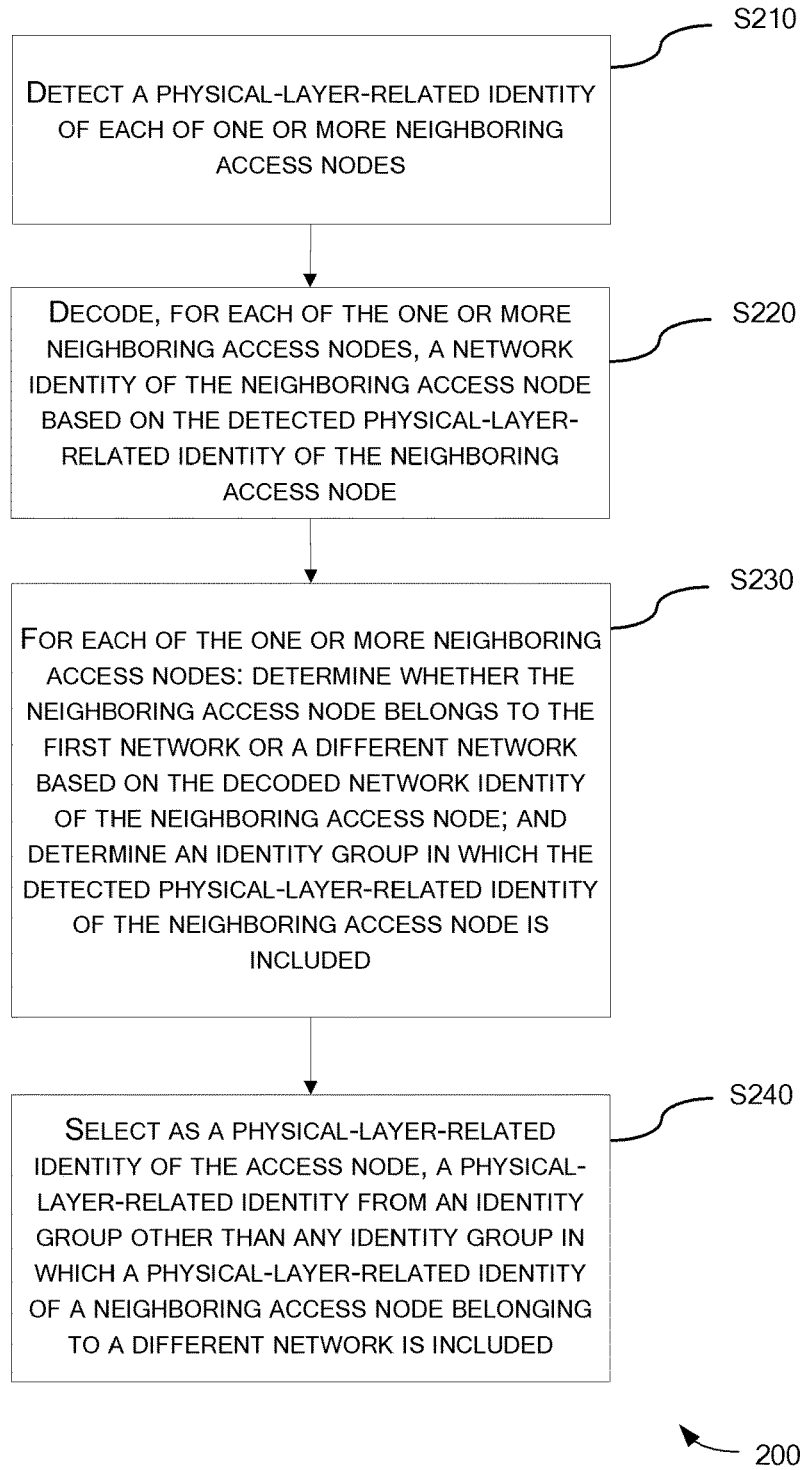
FIG. 2 is a flowchart illustrating a method for facilitating network identification according to an embodiment of the present disclosure.

FIG. 2 is a flowchart illustrating a method 200 for facilitating network identification according to an embodiment of the present disclosure. The method 200 can be performed at an access node of a first network (e.g., at AN 112 of the network 110 in FIG. 1). For example, the access node can be an evolved NodeB (eNB) in an LTE network.

The method 200 includes the following steps.

At step S210, a physical-layer-related identity of each of one or more neighboring access nodes is detected.

Here, for each access node, its physical-layer-related identity is at least associated with a sync signal sequence used by that access node. For example, a physical-layer-related identity can be a PANI as mentioned above.

In the context of the present disclosure, a "neighboring" access node of a particular access node has a coverage area that at least partially overlaps the coverage area of the particular access node. In an example, the detection in the step S210 is made by listening to a beacon channel and blindly detecting a sync signal sequence in a beacon broadcast by each neighboring access node on the beacon channel. In this case, the access node acts like a UE for AN discovery.

At step S220, for each of the one or more neighboring access nodes, a network identity of the neighboring access node is decoded based on the detected physical-layer-related identity of the neighboring access node. Here, the network identity can be an NI as mentioned above and can be decoded in the same way as described above in connection with NI.

At step S230, for each of the one or more neighboring access nodes, it is first determined whether the neighboring access node belongs to the first network (e.g., the network 110 in FIG. 1) or a different network (e.g., the network 120 in FIG. 1) based on the decoded network identity of the neighboring access node.

Then, an identity group in which the detected physical-layer-related identity of the neighboring access node is included is determined. Here, available physical-layer-related identities (e.g., the entire PANI pool or a subset thereof) are divided into a number of identity groups and such division is known to all access nodes and UEs. This determination can be made based on such knowledge.

At step S240, a physical-layer-related identity is selected from an identity group other than any identity group in which a physical-layer-related identity of a neighboring access node belonging to a different network is included, as a physical-layer-related identity of the access node. This ensures that any two neighboring access nodes belonging to different networks will never have their physical-layer-related identities selected from the same identity group.

Preferably, in the step S240, the physical-layer-related identity of the access node is selected from an identity group in which a physical-layer-related identity of a neighboring access node belonging to the first network is included. That is, it is preferred that two or more neighboring access nodes of the same network will have their physical-layer-related identities selected from the same identity group. In this way, the number of identity groups used by neighboring access nodes of a single network can be reduced.

In an embodiment, the method 200 further includes a step of transmitting, to a User Equipment (UE), information indicating one or more identity groups associated with the first network. Each of the one or more identity groups includes the physical-layer-related identity of the access node and/or a physical-layer-related identity of at least one neighboring access node of the first network. This is not necessary if the access node and its neighboring access nodes of the first network have their physical-layer-related identities selected from the same identity group. However, this is preferred when the access node and its neighboring access nodes of the first network have their physical-layer-related identities selected from more than one identity group, since it allows the UE to quickly identify an intra-network access node having a physical-layer-related identity selected from a different identity group than its serving access node.

Figure 3:
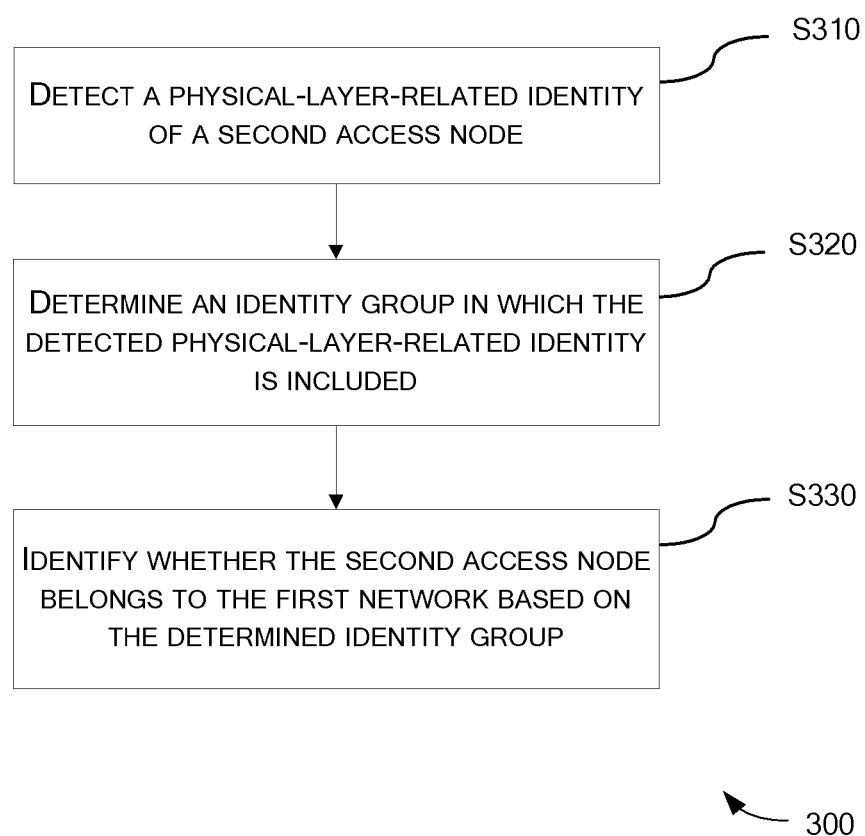
FIG. 3 is a flowchart illustrating a method for network identification according to an embodiment of the present disclosure.

Accordingly, FIG. 3 is a flowchart illustrating a method 300 for network identification according to an embodiment of the present disclosure. The method 300 can be performed at a User Equipment (UE) served by a first access node of a first network (e.g., at UE 102 served by the AN 112 of the network 110 in FIG. 1).

The method 300 includes the following steps.

At step S310, a physical-layer-related identity of a second access node is detected. Here, for each access node, its physical-layer-related identity is at least associated with a sync signal sequence used by that access node. As described above, the detection in the step S310 can be made by listening to a beacon channel and blindly detecting a sync signal sequence in a beacon broadcast by the second access node on the beacon channel.

At step S320, an identity group in which the detected physical-layer-related identity is included is determined. As described above in connection with the step S230 in FIG. 2, available physical-layer-related identities are divided into a number of identity groups and such division is known to all access nodes and UEs. This determination can be made based on such knowledge.

At step S330, it is identified whether the second access node belongs to the first network based on the determined identity group. Here, the first access node and its neighboring access nodes of the first network are associated with one or more identity groups that are different from any identity group associated with any neighboring access node of any other network.

In an embodiment, the identifying step S330 is performed by determining whether the determined identity group is identical to any of the one or more identity groups.

In an example where the first access node and its neighboring access nodes of the first network are associated with two or more identity groups, the method 300 further includes a step of receiving, from the first access node, information indicating the two or more identity groups.

In an embodiment, the identifying in the step S330 facilitates measurement by the UE regarding the second access node. For example, it is assumed that the second access node belongs to the first network and the UE needs to measure an RSRP from an intra-network access node (i.e., an access node of the first network), if any. In this case, the UE can determine that the second access node belongs to the first network simply because the physical-layer-related identity of the second access node is included in an identity group associated with the first access node or any of its neighboring access nodes. Then, the UE can measure the RSRP and report the RSRP measurement to the first access node when appropriate, without having to decode the network identity of the second access node. In addition, the UE can also avoid unnecessary measurement of RSRP from any inter-network access node. In this way, the delay in the measurement-report process can be reduced.

This also applies to neighbor discovery. When the UE listens to the beacon channel, trying to discover any intra-network or inter-network neighboring access node, it can quickly determine whether a beacon is transmitted from an intra-network or inter-network neighboring access node with the above method 300.

Figure 4:
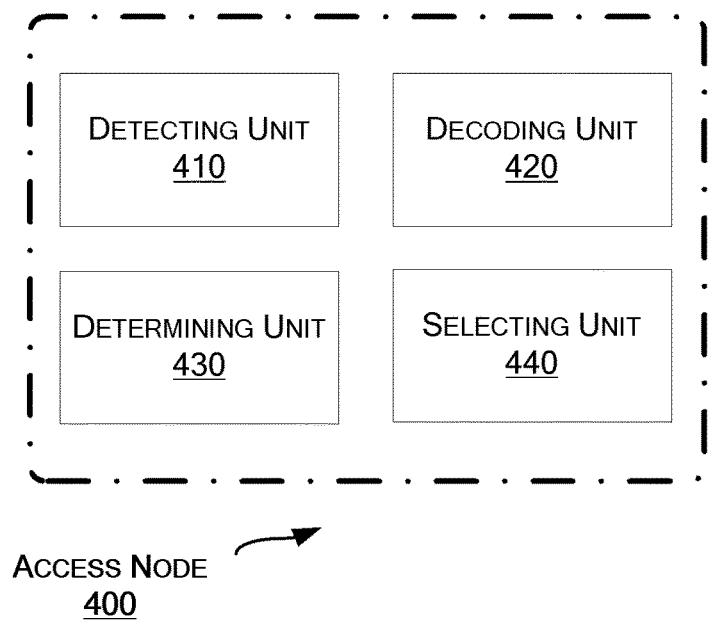
FIG. 4 is a block diagram of an access node according to an embodiment of the present disclosure.

Correspondingly to the method 200 as described above, an access node is provided. FIG. 4 is a block diagram of an access node 400 according to an embodiment of the present disclosure. The access node 400 is e.g., an eNB of a first network.

As shown in FIG. 4, the access node 400 includes a detecting unit 410 configured to detect a physical-layer-related identity of each of one or more neighboring access nodes. The access node 400 further includes a decoding unit 420 configured to decode, for each of the one or more neighboring access nodes, a network identity of the neighboring access node based on the detected physical-layer-related identity of the neighboring access node. The access node 400 further includes a determining unit 430 configured to, for each of the one or more neighboring access nodes: determine whether the neighboring access node belongs to the first network or a different network based on the decoded network identity of the neighboring access node; and determine an identity group in which the detected physical-layer-related identity of the neighboring access node is included. The access node 400 further includes a selecting unit 440 configured to select, as a physical-layer-related identity of the access node, a physical-layer-related identity from an identity group other than any identity group in which a physical-layer-related identity of a neighboring access node belonging to a different network is included.

In an embodiment, the physical-layer-related identity of the access node is selected from an identity group in which a physical-layer-related identity of a neighboring access node belonging to the first network is included.

In an embodiment, the access node 400 further includes a transmitting unit (not shown) configured to transmit, to a User Equipment (UE), information indicating one or more identity groups associated with the first network. Each identity group includes the physical-layer-related identity of the access node and/or a physical-layer-related identity of at least one neighboring access node of the first network.

In an embodiment, for each access node, its physical-layer-related identity is at least associated with a sync signal sequence used by that access node.

Each of the units 410-440 can be implemented as a pure hardware solution or as a combination of software and hardware, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 2.

Figure 5:
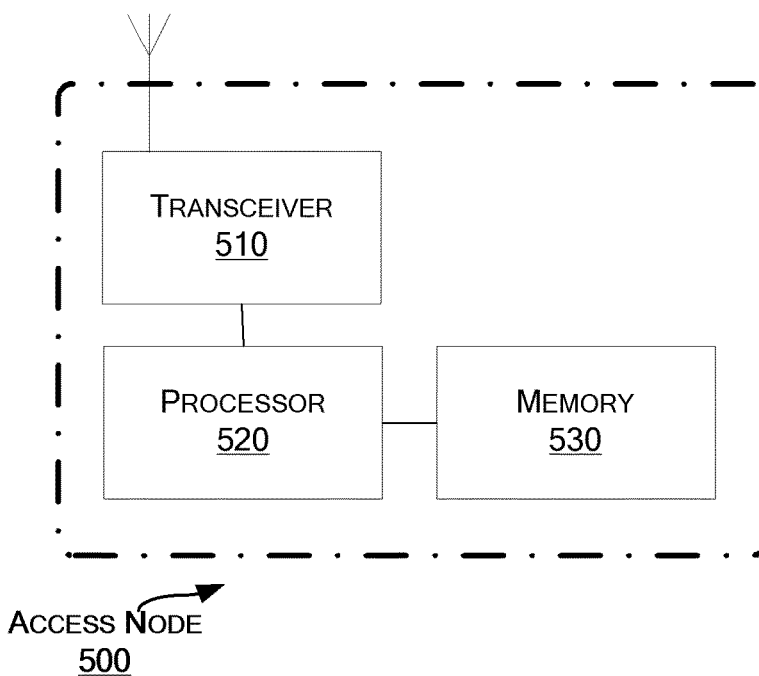
FIG. 5 is a block diagram of an access node according to another embodiment of the present disclosure.

FIG. 5 is a block diagram of an access node 500 according to another embodiment of the present disclosure. The access node 500 is e.g., an eNB of a first network.

The access node 500 includes a transceiver 510, a processor 520 and a memory 530. The memory 530 contains instructions executable by the processor 520 whereby the access node 500 is operative to: detect a physical-layer-related identity of each of one or more neighboring access nodes; and decode, for each of the one or more neighboring access nodes, a network identity of the neighboring access node based on the detected physical-layer-related identity of the neighboring access node. The memory 530 further contains instructions executable by the processor 520 whereby the access node 500 is operative to: for each of the one or more neighboring access nodes: determine whether the neighboring access node belongs to the first network or a different network based on the decoded network identity of the neighboring access node; and determine an identity group in which the detected physical-layer-related identity of the neighboring access node is included. The memory 530 contains instructions executable by the processor 520 whereby the access node 500 is operative to: select, as a physical-layer-related identity of the access node, a physical-layer-related identity from an identity group other than any identity group in which a physical-layer-related identity of a neighboring access node belonging to a different network is included.

Figure 6:
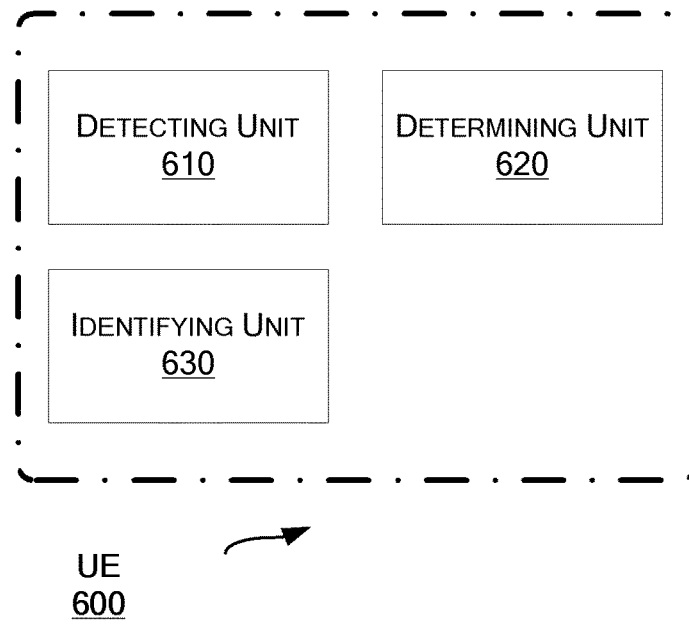
FIG. 6 is a block diagram of a UE according to an embodiment of the present disclosure.

Correspondingly to the method 300 as described above, a UE is provided. FIG. 6 is a block diagram of a UE 600 according to an embodiment of the present disclosure. The UE 600 is served by a first access node of a first network.

As shown in FIG. 6, the UE 600 includes a detecting unit 610 configured to detect a physical-layer-related identity of a second access node. The UE 600 further includes a determining unit 620 configured to determine an identity group in which the detected physical-layer-related identity is included. The UE 600 further includes an identifying unit 630 configured to identify whether the second access node belongs to the first network based on the determined identity group. Here, the first access node and its neighboring access nodes of the first network are associated with one or more identity groups that are different from any identity group associated with any neighboring access node of any other network.

In an embodiment, the identifying unit 630 is configured to identify whether the second access node belongs to the first network by determining whether the determined identity group is identical to any of the one or more identity groups.

In an embodiment, the first access node and its neighboring access nodes of the first network are associated with two or more identity groups. The UE 600 further includes: a receiving unit (not shown) configured to receive, from the first access node, information indicating the two or more identity groups.

In an embodiment, for each access node, its physical-layer-related identity is at least associated with a sync signal sequence used by that access node.

In an embodiment, the identifying by the identifying unit 630 facilitates measurement by the UE 600 regarding the second access node.

Each of the units 610-630 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 3.

Figure 7:
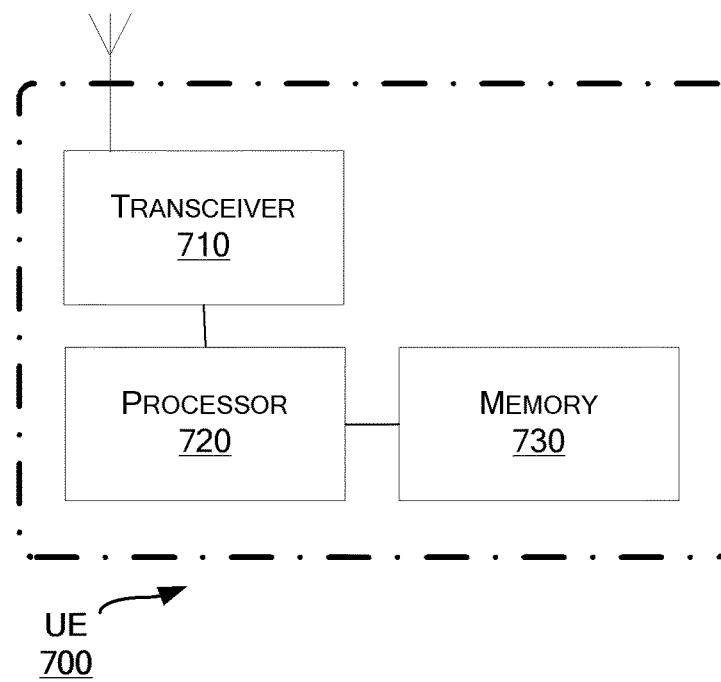
FIG. 7 is a block diagram of a UE according to another embodiment of the present disclosure.

FIG. 7 is a block diagram of a UE 700 according to another embodiment of the present disclosure. The UE 700 is served by a first access node of a first network.

The UE 700 includes a transceiver 710, a processor 720 and a memory 730. The memory 730 contains instructions executable by the processor 720 whereby the UE 700 is operative to: detect a physical-layer-related identity of a second access node; determine an identity group in which the detected physical-layer-related identity is included; and identify whether the second access node belongs to the first network based on the determined identity group. The first access node and its neighboring access nodes of the first network are associated with one or more identity groups that are different from any identity group associated with any neighboring access node of any other network.

The present disclosure also provides at least one computer program product in the form of a non-volatile or volatile memory, e.g., an Electrically Erasable Programmable Read-Only Memory (EEPROM), a flash memory and a hard drive. The computer program product includes a computer program. The computer program includes: code/computer readable instructions, which when executed by the processor 520 causes the access node 500 to perform the actions, e.g., of the procedure described earlier in conjunction with FIG. 2; or code/computer readable instructions, which when executed by the processor 720 causes the UE 700 to perform the actions, e.g., of the procedure described earlier in conjunction with FIG. 3.

The computer program product may be configured as a computer program code structured in computer program modules. The computer program modules could essentially perform the actions of the flow illustrated in FIG. 2, or the actions of the flow illustrated in FIG. 3.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method for facilitating network identification, comprising, at an access node of a first network:
    detecting a physical-layer-related identity of each of one or more neighboring access nodes;
    decoding, for each of the one or more neighboring access nodes, a network identity of the neighboring access node based on the detected physical-layer-related identity of the neighboring access node;
    for each of the one or more neighboring access nodes:
        determining whether the neighboring access node belongs to the first network or a different network based on the decoded network identity of the neighboring access node; and
        determining an identity group in which the detected physical-layer-related identity of the neighboring access node is included; and
    selecting, as a physical-layer-related identity of the access node, a physical-layer-related identity from an identity group other than any identity group in which a physical-layer-related identity of a neighboring access node belonging to a different network is included.

2. The method of claim 1, wherein the physical-layer-related identity of the access node is selected from an identity group in which a physical-layer-related identity of a neighboring access node belonging to the first network is included.

3. The method of claim 1, further comprising:
    transmitting, to a User Equipment (UE), information indicating one or more identity groups associated with the first network, each identity group including at least the physical-layer-related identity of the access node or a physical-layer-related identity of at least one neighboring access node of the first network.

4. The method of claim 1, wherein the physical-layer-related identity of each of one or more neighboring access nodes is at least associated with a synchronization signal sequence used by a corresponding neighboring access code of the one or more neighboring access nodes.

5. An access node of a first network, comprising:
    a processor and non-transitory computer-readable storage medium storing instructions that executed by the processor to cause the access node to:
    detect a physical-layer-related identity of each of one or more neighboring access nodes,
    decode, for each of the one or more neighboring access nodes, a network identity of the neighboring access node based on the detected physical-layer-related identity of the neighboring access node;
    for each of the one or more neighboring access nodes:
        determine whether the neighboring access node belongs to the first network or a different network based on the decoded network identity of the neighboring access node, and
        determine an identity group in which the detected physical-layer-related identity of the neighboring access node is included, and
    select, as a physical-layer-related identity of the access node, a physical-layer-related identity from an identity group other than any identity group in which a physical-layer-related identity of a neighboring access node belonging to a different network is included.

6. The access node of claim 5, wherein the physical-layer-related identity of the access node is selected from an identity group in which a physical-layer-related identity of a neighboring access node belonging to the first network is included.

7. The access node of claim 5, further to:

transmit, to a User Equipment (UE), information indicating one or more identity groups associated with the first network, each identity group including at least the physical-layer-related identity of the access node or a physical-layer-related identity of at least one neighboring access node of the first network.

8. The access node of claim 5, wherein the physical-layer-related identity of each of one or more neighboring access nodes is at least associated with a synchronization signal sequence used by a corresponding neighboring access code of the one or more neighboring access nodes.

* * * * *